United States Patent [19]

Horton

[11] Patent Number: 5,701,200
[45] Date of Patent: Dec. 23, 1997

[54] MONOLITHIC RELAY LENS SYSTEM PARTICULARLY SUITED FOR USE IN AN ENDOSCOPE

[75] Inventor: Richard F. Horton, Los Lunas, N. Mex.

[73] Assignee: Symbiosis Corporation, Miami, Fla.

[21] Appl. No.: 330,369

[22] Filed: Oct. 27, 1994

[51] Int. Cl.$^6$ .................................................. G02B 23/00
[52] U.S. Cl. ......................... 359/435; 359/362; 359/434
[58] Field of Search ........................... 359/362, 363, 359/369, 422, 423, 434, 435, 642, 656, 659, 661, 708, 754; 128/4–6

[56] References Cited

U.S. PATENT DOCUMENTS

| | | | |
|---|---|---|---|
| 3,257,907 | 6/1966 | Hopkins | 409/86 |
| 4,168,882 | 9/1979 | Hopkins | 359/434 |
| 4,403,837 | 9/1983 | Nakahashi | 359/770 |
| 4,432,832 | 2/1984 | Fantone | 216/24 |
| 4,575,195 | 3/1986 | Hoogland | 359/716 |
| 4,662,725 | 5/1987 | Nisioka | 359/708 |
| 4,664,486 | 5/1987 | Landre et al. | 359/380 |
| 4,674,844 | 6/1987 | Nishioka et al. | 359/782 |
| 4,693,568 | 9/1987 | Takahashi | 359/772 |
| 4,721,372 | 1/1988 | Yokota | 359/658 |
| 4,723,843 | 2/1988 | Zobel | 359/435 |
| 4,784,118 | 11/1988 | Fantone et al. | 359/434 |
| 4,964,710 | 10/1990 | Leiner | 359/435 |
| 5,097,359 | 3/1992 | McKinley | 359/435 |
| 5,188,092 | 2/1993 | White | 359/435 |
| 5,296,971 | 3/1994 | Mori | 359/716 |
| 5,321,457 | 6/1994 | Imaizumi | 354/222 |
| 5,327,283 | 7/1994 | Zobel | 359/434 |
| 5,341,240 | 8/1994 | Broome | 359/435 |
| 5,359,377 | 10/1994 | Kamo | 354/222 |
| 5,359,453 | 10/1994 | Ning | 359/435 |
| 5,359,456 | 10/1994 | Kikuchi | 359/654 |

FOREIGN PATENT DOCUMENTS

| | | | |
|---|---|---|---|
| 2305473 | 8/1974 | Germany | 359/435 |

*Primary Examiner*—Thong Nguyen
*Attorney, Agent, or Firm*—David P. Gordon

[57] ABSTRACT

A monolithic relay lens system for an endoscope is provided and includes a plurality of alternating individual polymeric lens elements bonded together with optical cement lenses of predetermined optical properties. In particular, multiple biconcave lenses of a first polymeric material are bonded to and alternated with multiple biconcave lenses of a second polymeric material by biconvex optical cement material lenses, in order to provide a monolithic and cylindrical achromatic optical structure. The polymeric lens elements of the system can be mass produced using injection molding. Low temperature polymeric material combinations, such as polystyrene and acrylic, are most easily injection molded and may, together with the optical cement, be used to manufacture disposable and very inexpensive relay lens systems. On the other hand, where a temperature resistant, autoclavable endoscope is preferred, high temperature polymeric lens combinations, such as polycarbonate and TPX can be used. The biconvex optical cement (VTC2) lenses are shaped by the concave surfaces of the first and second polymeric material lens elements.

21 Claims, 7 Drawing Sheets

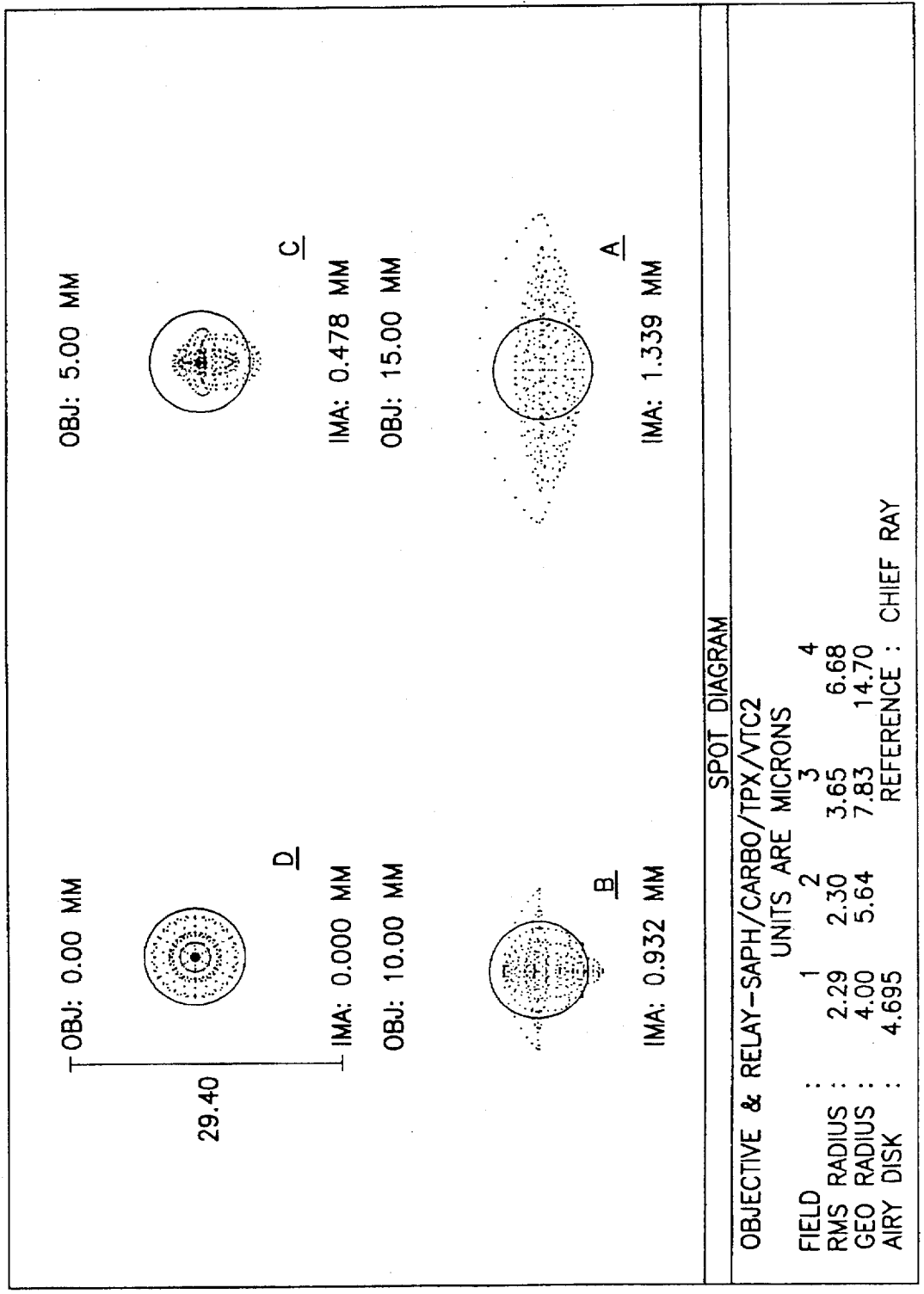

MONOLITHIC RELAY LENS SYSTEM PARTICULARLY SUITED FOR USE IN AN ENDOSCOPE

This application is related to U.S. Ser. No. 08/330,188, entitled "Objective Lens for Endoscope" which is filed on even date herewith and which is hereby incorporated by reference in its entirety herein.

BACKGROUND OF THE INVENTION

1. Field of the Invention

This invention relates broadly to endoscopes and laparoscopes. More particularly, this invention relates to relay lens systems for endoscopes and laparoscopes.

2. State of the Art

Endoscopes are optical systems which are well known in the art for allowing the optical viewing of otherwise inaccessible areas within the human body without the use of excessive surgery. Besides minimizing the invasiveness of the surgery, endoscopes provide the advantage that, depending on the optical resolution of the endoscope, the taking of biopsy samples for later laboratory analysis may be unnecessary where direct endoscopic optical diagnosis is sufficient. Laparoscopes are specialized endoscopes which are primarily used to examine the peritoneal cavity (pertaining to the abdominal and pelvic cavities) of a patient.

Structurally, endoscopes generally include an airtight and waterproof elongated tube with a distal end for placing within the body cavity of the patient to be examined, and a proximal end for optical viewing by the physician. The elongated tube is usually comprised of three significant optical parts: the objective lens; the relay lens system; and the eyepiece. The objective lens is located at the distal end of the tube, and forms a first inverted image of the observed area. The function of the relay lens system is to take the image formed by the objective lens, and to refocus and reinvert the first image several times before forming a final upright image at the proximal end of the tube. The final upright image is then observed through the eyepiece by an observer physician.

Such a high quality image is not easily produced due to several imaging problems present within conventional lens systems. The first problem relates to the image brightness of an optical system. The image brightness of an optical system is affected by the shape, composition and size of its lens elements. The smaller the focal length to diameter ratio of an optical system, the faster the system will be and the brighter the transmitted image will appear. This ratio is also referred to as the f/number. In laparoscopic optical systems, the f/number is usually defined by the elements following the objective, such as the relay system. The image brightness is also affected by transmission losses caused by light absorption and scattering within the lens elements. An example of absorption loss can be illustrated by using a lens with a slight amber cast to form an image from an object. In such a lens, any blue light originating from the original object would be absorbed by the amber colored lens, thus causing a chromatic distortion in the formed image as well as a reduction in brightness. Scattering loss occurs as the result of the presence of incompletely or improperly polished lens elements in the optical system. In such a case, the lens elements may not absorb the light directly, but instead scatter it by reflection or refraction out of the intended ray paths to be absorbed by the walls of the system or simply lost. More particularly, a portion of the light rays originating from the initial image produced by the objective lens and passing through the relay lens system are either reflected or refracted beyond a critical angle at these lens surface interfaces thus creating various light and image aberrations within the relay system. The portion of light rays from an image that are reflected or scattered depends on the magnitude of the index of refraction at the lens surface interfaces. The more optically dissimilar one lens material is from an adjoining lens material, the more a light ray passing from one lens material into the next will bend away from its angle of incidence or be reflected, and the larger the index of refraction and the coefficient of reflection will be at the lens surface interface of the two adjoining lens materials. Most conventional relay lens systems contain multiple lens surface interfaces where the lens elements typically possess significantly dissimilar optical properties (e.g., glass:air, glass:plastic, air:plastic, etc.), and thus exhibit large indices of refraction and coefficients of reflection. Such conventional relay lens systems therefore require the application of expensive Anti-Reflection (AR) coatings at the lens surface interfaces to minimize the loss of the image brightness and clarity due to reflection and scattering. However, in addition to being a costly remedy, AR coatings only partially resolve the problem of light loss due to internal reflection and scattering. In addition, scattering can also be the cause of poor contrast in an image as a result of the flooding of the image plane with unwanted and out of focus light.

A second common problem associated with conventional lenses is that of image aberrations, such as third order sphericals, comas and astigmatisms, all of which reduce the sharpness of the formed image. Additionally, field curvature may be such that the image cannot viewed in its entirety from any one angle, i.e. be accommodated over an angular extent all at the same time by a normal eye, although the eye could focus on different areas in the image at different times.

A third problem found in conventional lens system is distortion. Most conventional lenses exhibit a small amount of radial distortion. Radial distortion occurs when the radial image scale varies as view angle goes from the center of the field of view to the edge of the field of view. Radial distortion is the cause for the "fish eye" effect produced by extremely wide field lenses.

A typical relay lens system is made of seven identical and often symmetrical compound lenses, four of which act as field lenses and three of which act as imaging lenses. The field lenses are situated at the image planes of the relay system and serve to receive and keep together the image rays which are then refocused by the imaging lens into a new image. More specifically, in this relay lens configuration, the first inverted image produced by the objective lens is reimaged twice before being formed into a final upright image at the eyepiece. Each compound lens of the relay lens system is further typically made of at least two or more elements to correct for inherent chromatic and geometric (spherical, field curvature, astigmatic, coma) aberrations.

The above mentioned deficiencies are at least partially addressed in U.S. Pat. No. 3,257,902 to Hopkins which discloses the use of solid rod-like glass lenses in a relay lens system for an endoscope. As the optical path of this relay system is for the most part located in a higher media than air, the relay operates at a lower effective f/number for a given path length than a similar relay system having an optical path length located predominantly in air. For this reason, a relay system using rod-like lenses will transmit a brighter image than a conventional system having the same length; or conversely, an equally bright image will be transmitted by a rod lens system over a greater distance of the relay system than that transmitted by a conventional lens system. The design disclosed in the Hopkins patent is relatively complex and requires difficult fabrication of the glass rod lens elements. This leads to corresponding difficulties in high volume manufacturing. In addition, the Hopkins design fails to disclose whether its components have similar elastic and thermal properties as well as being sufficiently temperature resistant such that they can be used in an autoclavable endoscope.

The shortcomings of the design disclosed in the Hopkins patent were partially addressed in U.S. Pat. No. 4,784,118 to Fantone et al. which discloses a relay lens system for a disposable endoscope including inexpensive and easy to manufacture polymeric rod lenses. In spite of the improvements in the cost and method of manufacture of the polymeric rod lenses disclosed by Fantone, that system still suffers from various astigmatic and chromatic optical aberrations. The design of the rod lens system in Fantone incorporates identical polymeric rod lenses having no additional lens elements for the correction of color or other multiple aberrations inherent in an optical system. The image transmitted still lacks adequate brightness and clarity. The system disclosed in Fantone, however, also fails to disclose an inexpensive autoclavable endoscope design with temperature resistant components.

Another problem that arises in the design of relay lens systems is that inherent chromatic and geometric aberrations associated with lenses are compounded in an optical transmission system containing multiple field and imaging lenses. Although it is known in the art to use achromatic, aspheric and multiple lens configurations to correct these aberrations, it becomes difficult to do so in longer optical transmission systems for the above mentioned reasons. Neither the Hopkins nor the Fantone patents, however, adequately correct for the aberrations or the significant resulting image quality loss suffered during transmission of the image from the objective lens to the eyepiece.

SUMMARY OF THE INVENTION

It is therefore an object of the invention to provide a relay lens system for an endoscope which is simple in design and easy to manufacture.

It is also an object of the invention to provide a relay lens system for an endoscope having inexpensive components.

It is another object of the invention to provide a relay lens system for an endoscope having a high optical quality in the relayed image.

It is a further an object of the invention to provide a relay lens system for an endoscope having lens components with small f/numbers.

An additional object of the invention to provide a relay lens system for an endoscope having lens components made up of two types of polymeric lenses cemented together by means of an optical cement material.

Another object of the invention is to provide a relay lens system for an endoscope that is autoclavable.

A further object of the invention is to provide a relay lens system for an endoscope with very low coefficients of reflection at the lens element interfaces.

It is also an object of the invention to provide a relay lens system for an endoscope that does not require Anti-Reflection coatings at the lens element interfaces.

Yet another object of the invention is to provide a relay lens system for an endoscope with all the lens elements having similar elastic and thermal properties.

It is a further object of the invention to provide a relay lens system for an endoscope that is monolithic and contains no glass:air interface.

In accordance with the objects of the invention, which will be discussed in detail below, a monolithic relay lens system for an endoscope is provided and includes a plurality of alternating individual polymeric lens elements bonded together with optical cement lenses of predetermined optical properties. More specifically, multiple biconcave lenses of a first polymeric material are bonded to and alternated with multiple biconcave lenses of a second polymeric material by biconvex optical cement material lenses, in order to provide a monolithic and cylindrical achromatic optical structure which can be used as a relay lens system for an endoscope. The optical cement lenses contribute to both the color and geometric aberration correction of the polymeric lenses.

When used as a component in an endoscope or laparoscope, the distal end of the relay lens system is axially aligned with an objective lens and the proximal end is axially aligned with a viewing eyepiece. The inverted image of the observed area formed by the objective lens is transmitted and reimaged only once by the relay lens system so that an upright image appears in front of the eyepiece of the endoscope for viewing or recording.

The dissimilar indices and dispersion qualities of the three elements (i.e., first and second polymers, and cement) of the solid relay lens design provide an improved correcting means for chromatic and geometric aberrations, and thus a higher overall quality optical image is transmitted. In addition, the lens element surface interfaces of the relay system exhibit very small changes in index of refraction at the interfaces, thus minimizing the light loss caused by reflection and scattering at these interfaces. The monolithic relay lens system reduces light loss more efficiently than conventional relay lens systems coated with even the most effective AR coatings. The system thus obviates the need for any type of AR coating, and provides a brighter image than would be possible with conventional AR coated relay lens systems. Finally, as all of the relay lens elements have similar elastic and thermal properties, the monolithic relay lens has an overall greater resistance to thermal and mechanical stress than would a conventional relay lens system.

The relay system of the invention is of a simple design and uses inexpensive parts. The two optically dissimilar polymeric lens elements of the system can be mass produced using injection molding. Low temperature polymeric material combinations, such as polystyrene and acrylic, are most easily injection molded and may, together with the optical cement, be used to manufacture disposable and very inexpensive relay lens systems. On the other hand, where a temperature resistant, autoclavable endoscope is preferred, high temperature polymeric lens combinations, such as polycarbonate and TPX (polymethylpentene), manufactured by Mitsui, can be used.

The lenses have an inherent cylindrical symmetry which allows them to be easily manufactured to the same diameter. The lenses should be molded with the proper spaced standoffs at each end, such that the correct distance for the intervening optical cement between each lens element is achieved. The shape of the optical cement lens elements is dictated by the concave surfaces of the first and second polymeric material lens elements. Once manufactured, the lens elements may then be assembled in a "V block" or V-shaped slot, to insure that the axis of each lens in the cemented assembly is parallel and coaxial to molded tolerances. As the relay system is made up of alternating cylindrically symmetrical lens elements, the lens elements may be reversed during assembly without consequence to the relay system.

Additional objects and advantages of the invention will become apparent to those skilled in the art upon reference to the detailed description taken in conjunction with the provided figures.

BRIEF DESCRIPTION OF THE DRAWINGS

FIG. 4 shows spot diagrams of raytrace data for the relay lens system of the invention;

DETAILED DESCRIPTION OF THE PREFERRED EMBODIMENT

Figure 1:
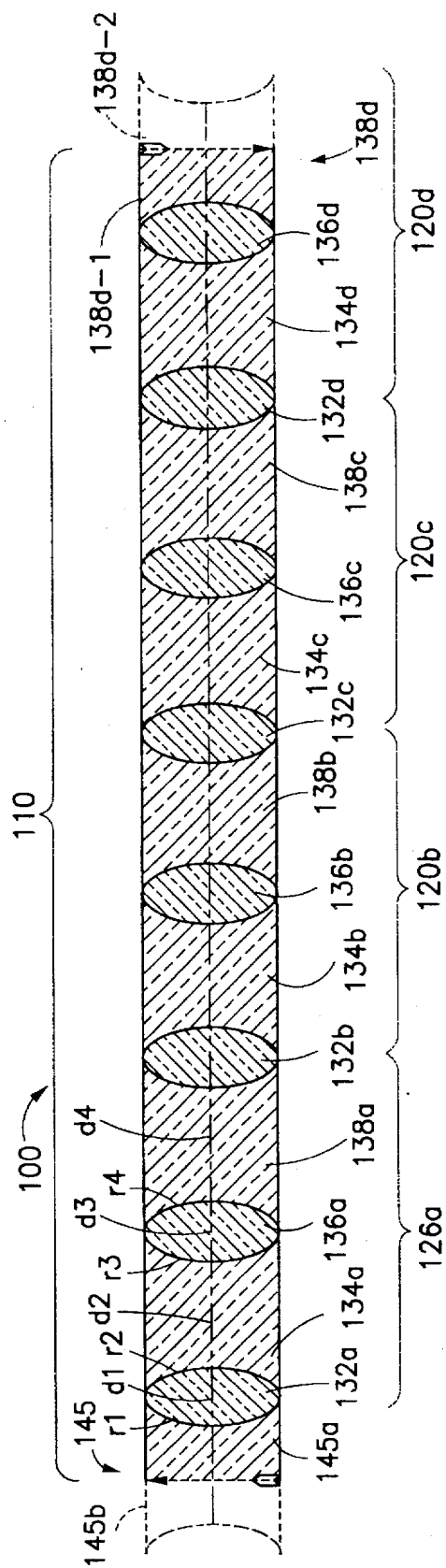
FIG. 1 is a cross-sectional view of a portion of the monolithic relay lens of the invention.

Turning now to FIG. 1, a detailed view of a portion 100 of the monolithic relay lens 10 of the invention is illustrated. The portion 100, which is cylindrical, can be viewed as being substantially coextensive with an optical portion 110 which acts to invert (or reinvert) an image. The optical portion 110, in turn, is substantially defined by four identical sub-portions 120a, 120b, 120c, and 120d, which each include four lens elements 132a, 134a, 136a, 138a; 132b, 134b, 136b, 138b; 132c, 134c, 136c, 138c; 132d, 134d, 136d, 138d. As will be discussed below in more detail, the optical portion 110 further includes a half (145a) of a biconcave lens 145 (the other half 145b shown in phantom), but does not include a second half (138d-2 shown in phantom) of the biconcave lens element 138d which is shown as part of sub-portion 120d. The reasons that half-lenses 145b and 138d-2 are shown in phantom are that, except for a very distal lens and very proximal lens, all lenses of the monolithic relay lens system 10 of the invention are either biconcave or biconvex as are shown by lenses 145 and 138d, and that the half-lenses 145b and 138d-2 are parts of other optical portions, namely the objective and the eye piece.

As seen in FIG. 1, each sub-portion 120 of optical portion 110 includes four lens elements. Two of the lens elements 132 (132a, 132b, 132c ... ) and 136 (136a, 136b, 136c ... ) are biconvex optical cement lens elements. A preferred cement for use is VTC2 which is a UV curing plastic cement manufactured by Sommers. The other two lens elements 134 (134a, 134b, 134c ... ) and 138 (138a, 138b, 138c ... ) are biconcave polymeric lens elements. In a preferred embodiment of the invention, one of the biconcave polymeric lens elements (e.g., 134) is an acrylic lens element, while the other of the biconcave polymeric lens elements (e.g., 138) is a polycarbonate lens element). As seen in FIG. 1, in each group 120, the acrylic lens element 134 and the polycarbonate lens element 138 are symmetrically positioned about and affixed to the second biconvex VTC2 optical cement lens element 136. In addition, the polycarbonate lens element 138 of that group, and the acrylic lens element of an adjacent group are symmetrically positioned about and affixed to the first biconvex VTC2 optical cement lens element 132 of the adjacent group.

It should be appreciated that the acrylic and polycarbonate lens components 134, 138 of the invention may be manufactured using an injection molding process. Such a process allows for high volume and inexpensive manufacturing while still producing a relay lens system with high optical quality. In addition, it should be appreciated that the biconvex optical cement lenses 132, 136 may be shaped by simply inserting the optical cement between the concave surfaces of the biconcave acrylic and polycarbonate lens elements 134, 138. The thickness of the first and second cement lens element can be controlled by the use of spacers (not shown) molded into one or both of the biconcave polycarbonate or acrylic lens elements. The cement lens elements thus formed contribute to both the color and geometric aberration correction of the acrylic and polycarbonate lenses.

According to the preferred embodiment of the invention, the various dimensions of the elements of a sub-portion 120 of the monolithic relay lens operating at f/7.14 are as described below:

| VTC2 (132) | d1: 4.538 | k1: −1.061 | n1: 1.548 |
|---|---|---|---|
|  | r1: 2.020 |  | v1: 43.8 |
| Polycarbonate (134) | d2: 8.477 | k2: −2.405 | n2: 1.585 |
|  | r2: −3.798 |  | v2: 30.3 |
| VTC2 (136) | d3: 4.538 | k3: −2.405 | n3: 1.548 |
|  | r3: 3.798 |  | v3: 43.8 |
| Acrylic (138) | d4: 6.800 | k4: −1.061 | n4: 1.490 |
|  | r4: −2.020 |  | v4: 57.2 |

In the numerical data shown above, reference symbols d1 through d4 represent axial distances between respective lens surfaces, reference symbols r1 through r4 represent radii of curvature of the respective lens surfaces, reference symbols n1 through n4 represent refractive indices of the respective lenses, reference symbols k1 through k4 represent conic constants of respective lenses, and reference symbols v1 through v4 represent Abbe's numbers of the respective lenses.

The unique combination of the three different materials in the four component sub-portion 100, provides for high optical quality as a result of the chromatic and geometric aberration correction effected by the symmetrical combination of the indices of refraction and dispersion of the three dissimilar lens materials.

Figure 2:
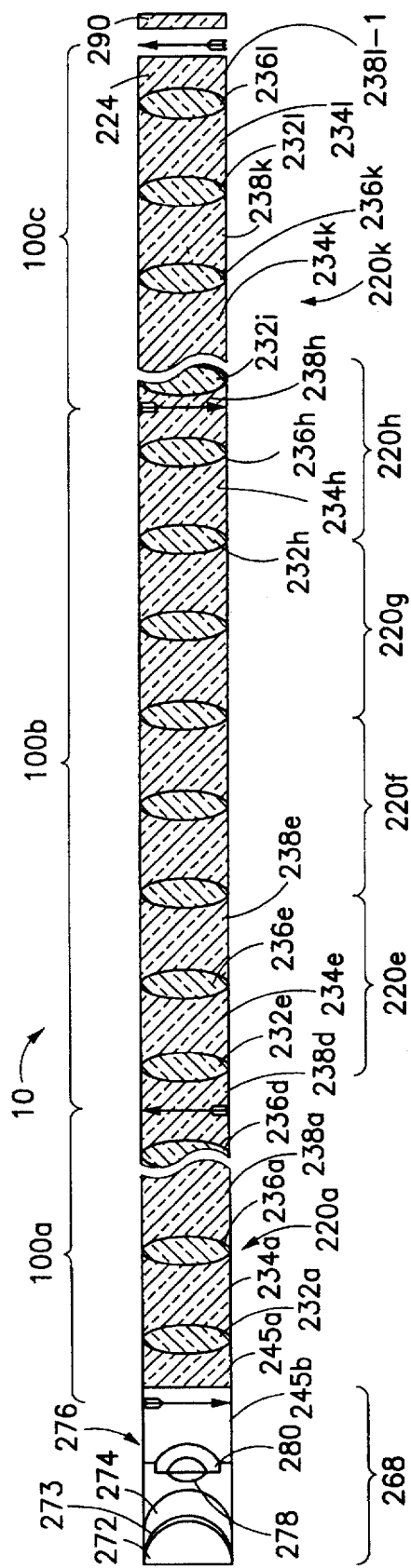
FIG. 2 is a cross-sectional view of a preferred endoscope optical system utilizing the relay lens system of the invention.

Referring now to FIG. 2, the preferred embodiment of an endoscope 10 utilizing the monolithic relay lens system of the invention. The relay system is shown to include three portions 100a, 100b, and 100c. The distal portion 100a takes an inverted image from the objective 268 and reinverts it; the middle portion 100b takes the reinverted image and inverts that; and the proximal portion 100c takes the "re-reinverted" image and inverts that image into an upright or non-inverted image. The three portions form a solid monolithic relay rod lens system with the objective 268 and the eye piece 290. The relay lenses include forty-four lenses from eleven full subgroups 220a, ... , 220e, 220f, 220g, 220h , ... , 220k (including lenses 232a–232k, 234a–234k, 236a–236k, and 238a–238k), and four lenses 232l, 234l, 236l, and 238l-1 which comprise most of a subgroup including two biconvex cement lenses 232l, 236l, a biconcave polycarbonate lens 234l, and a concavo-plano acrylic lens 238l-1. The objective 268 includes biconcave lens element 276. The proximal portion 245a of lens element 276 corresponds to lens element 145a in FIG. 1. Lens element 276 has its image plane at its center, between portions 245a, 245b. The same can be said for lens elements 238a–238k. Lens element 238l is a concavo-plano lens element which is essentially one half the length of any of the 238a–238k elements so that its image plane is on its proximal planar surface. Thus, it will be appreciated that each of the three portions 100a–100c shares a lens element (238d, 238h) with an adjacent portion, and that the distal portion 100a shares a lens element 245a with the objective 268. It should be noted that the axial distance or d value for the lens 238l -1 is typically one-half of the length d4 of the arcylic lens 138 (set forth above); the r values of the concave surfaces are typically equal to r4, while the r values of the planar surfaces are typically infinity. It should also be noted that the inverted image is reinverted at the middle of acrylic lens element 238d, re-reinverted at the middle of acrylic lens element 238h, and finally inverted in to an upright image at the end of acrylic concavo-plano lens element 238l-1 (although in FIG. 2, the image is shown just proximally adjacent the element 238l-1 for purposes of clarity). As discussed below, the image 224 formed at the proximal end of the lens system can be viewed through an eyepiece 290, which may incorporate photographic or video recording devices (not shown).

As suggested by FIG. 2, the monolithic relay lens system 100 is typically included as part of an endoscope 10. Thus, an inverting objective lens 268 is axially aligned with the distal end of the monolithic relay lens system 10, and a viewing eyepiece 290 is axially aligned with the proximal end of the relay lens system 10. In the preferred embodiment of the invention, the objective lens 268 has four optical elements. The first element is a plano-convex spherical sapphire lens 272 which combines the function of a hard exterior window and first optical element of the objective lens 268. The second and third elements are a concavo-convex air lens 273 and an aspheric concavo-convex polycarbonate lens 274 respectively, with the air lens 273 being defined by the spherical convex surface of the sapphire lens 272 and the aspheric concave surface of the concavo-convex polycarbonate lens 274. The fourth element of the objective lens 268 is an acrylic concavo-concavo lens 276. As noted above, this element 276 is contiguous with the most distal relay lens element 245A. The acrylic lens 276 preferably contains additional corrective lens elements 278, 280 for a higher quality image which is produced at the center of the acrylic lens 276. Preferred embodiments of the objective lens are described in further detail in previously incorporated application Ser. No. 08/330,188. It should be appreciated that the combination of the relay lens system of the invention with the preferred objective lens provides an advantageous arrangement in that the distal end of the relay lens system can be coupled directly to the proximal end of the objective lens 268.

Several different materials may be used to construct the monolithic relay lens system of the invention. As a first alternative embodiment, a low temperature plastic such as polystyrene, which has properties similar to polycarbonate, may be used instead of polycarbonate. As a low temperature plastic, polystyrene is easier and less expensive to manufacture by an injection molding process than polycarbonate. Furthermore, as both polystyrene and acrylic are low temperature plastics, a relay lens system using the VTC2/ acrylic/ VTC2/polystyrene sub-portion will be an easier and less expensive system to manufacture by injection molding than the VTC2/acrylic/VTC2/polycarbonate subgroup. As a second alternative embodiment, the acrylic lens elements may be replaced with TPX (manufactured by Mitsui) lens elements, a high temperature plastic, to achieve a temperature resistant relay lens system that is usable in an autoclavable endoscope design. The VTC2/TPX/VTC2/ polycarbonate sub-group, although slightly more expensive to manufacture by injection molding than the low temperature relay lens subgroups, exhibits excellent imaging and thermal properties and is able to survive high temperatures such as those reached during the autoclaving of the endoscope.

The dimensions of the elements of the two alternative embodiments of the relay lens section illustrated in FIG. 1 are further described below:

First alternative embodiment which operates at f/7.4 (VTC2/ acrylic/VTC2/polystyrene . . . )

| VTC2 | d1: 3.839 | k1: −1.047 | n1: 1.548 |
|---|---|---|---|
|  | r1: 1.841 |  | v1: 43.8 |
| Polystyrene | d2: 12.972 | k2: −2.120 | n2: 1.590 |
|  | r2: −3.243 |  | v2: 30.9 |
| VTC2 | d3: 3.839 | k3: −2.120 | n3: 1.548 |
|  | r3: 3.243 |  | v3: 43.8 |
| Acrylic | d4: 4.350 | k4: −1.047 | n4: 1.490 |
|  | r4: −1.841 |  | v4: 57.2 |

Second alternative embodiment which operates at f/6.5 (VTC2/TPX/VTC2/polycarbonate . . . )

| VTC2 | d1: 4.735 | k1: −21.023 | n1: 1.548 |
|---|---|---|---|
|  | r1: 16.713 |  | v1: 43.8 |
| TPX | d2: 7.016 | k2: −1.002 | n2: 1.466 |
|  | r2: −3.761 |  | v2: 56.6 |
| VTC2 | d3: 4.735 | k3: −1.002 | n3: 1.548 |
|  | r3: 3.761 |  | v3: 43.8 |
| Polycarbonate | d4: 4.350 | k4: −1.047 | n4: 1.586 |
|  | r4: −16.713 |  | v4: 30.3 |

Figure 2A:
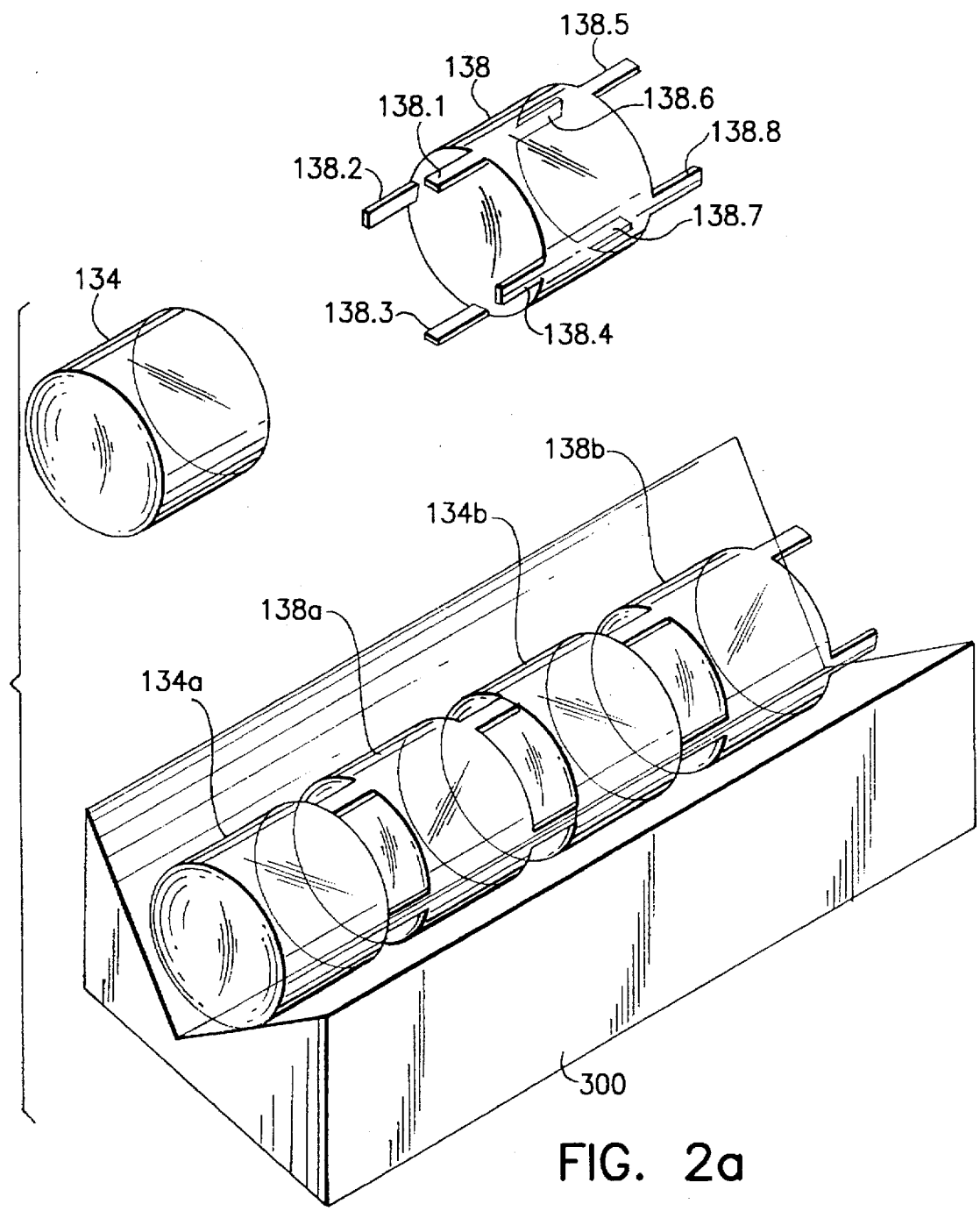
FIG. 2a is a perspective view of a "V block" used to assemble the relay lens system of the invention.

As shown in FIG. 2a, the lens elements of the relay lens system may be assembled using a V-block 300. Alternating lens elements, e.g. 138 can be molded with integral spacers 138.1-138.8 so that appropriate space between elements 134 and 138 is maintained when the VTC2 cement is added.

Figure 3:
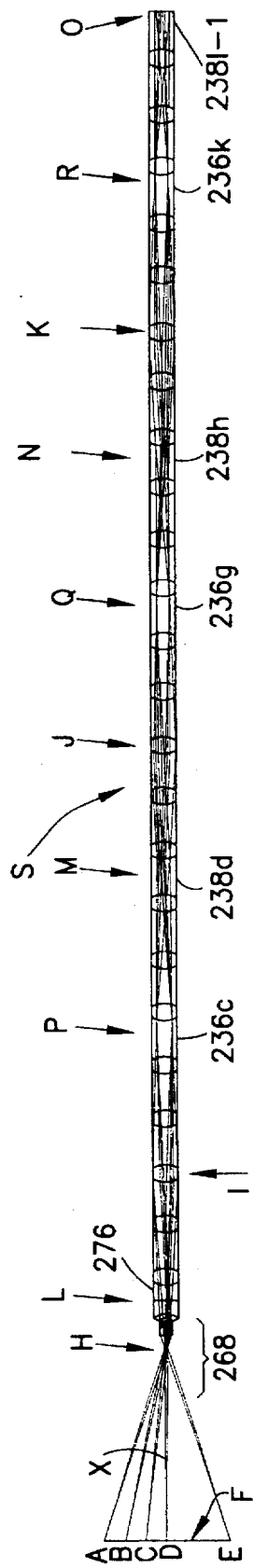
FIG. 3 is an optical layout illustrating the ray paths and image orientation through the relay lens system of the invention.

Turning now to FIG. 3, a ray trace diagram of the second alternate embodiment of the invention with the Sapphire objective lens 268 as disclosed in FIG. 2 is shown. Light rays emanating from object points A, B, C, D and E are traced through the objective lens 268 and the relay lens system S. Points A, B, C, D, and E are located on the same object plane F which is situated at a distance of 50 mm from the surface of the first lens element of the object lens 268. Point A is located at +15 mm from the lens axis X, B is at +10 mm, C is at +5 mm, D is on the axis and E is at −15 mm. The system as described operates at an effective f/number of 6.5, with an effective focal length of 4.5 mm. The working entrance pupil H is merely the image of the inside of the relay lens in several places, namely I, J and K, where the bundle of rays is of largest diameter. Note that the working entrance H is located approximately 2.5 mm in front of the first lens element. The object plane F is formed into a first, inverted, image at L inside lens element 276. In this embodiment, L represents a geometric image plane and not an actual break in the lens. The second, erect, image of F is at M inside lens element 238d, followed by a third, inverted, image at N inside lens element 238h, and a final erect image at O on the planar surface of lens element 238l-1, where it can be observed by an eyepiece or imaged directly onto some recording media. The image of the entrance pupil H is formed at positions P, Q and R, along the relay. The lens elements 236c, 236g, 236k around P, Q, and R would correspond to reimaging lenses in a conventional reimaging system, and the lens elements 238d, 238h, 238l-1 around L, M and N would correspond to field lenses.

Figure 5:
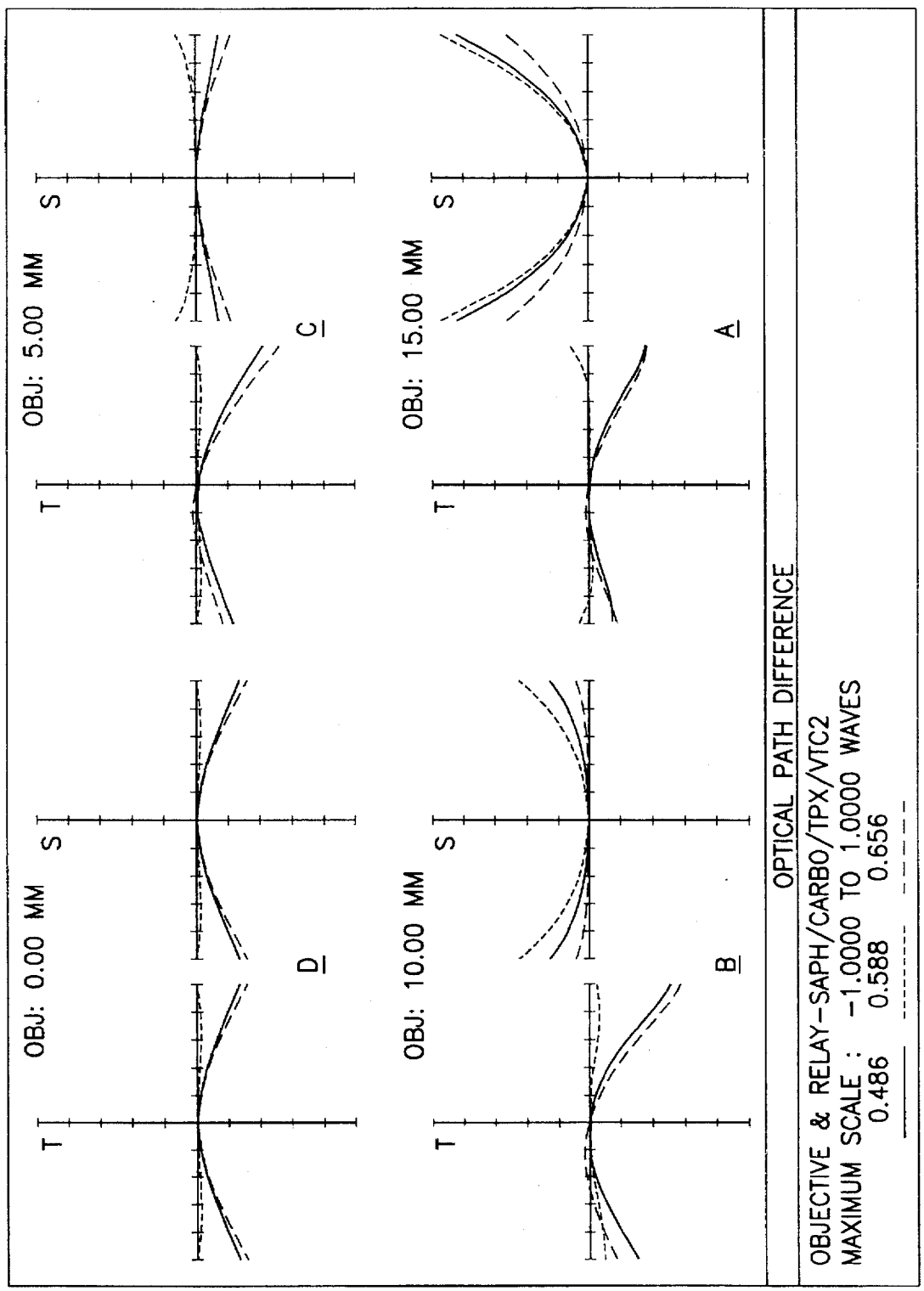
FIG. 5 shows optical path difference diagrams of raytrace data for the second embodiment of the invention.

Referring to FIGS. 4–7, various raytrace data for the second alternate embodiment are shown. FIG. 4 shows spot diagrams of field points A, B, C and D as shown in FIG. 3, situated at 15 mm, 10 mm, 5 mm, and 0 mm respectively from the objective lens axis X (see FIG. 3). It will be observed that almost all of the rays traced fall within the Airy Disk radius of 4.659 Microns. FIG. 5 shows the Optical Path Difference (OPD) curves for the same four field points. It will be noted that the OPD's are well within ¼ wave for all four field points.

Figure 6:
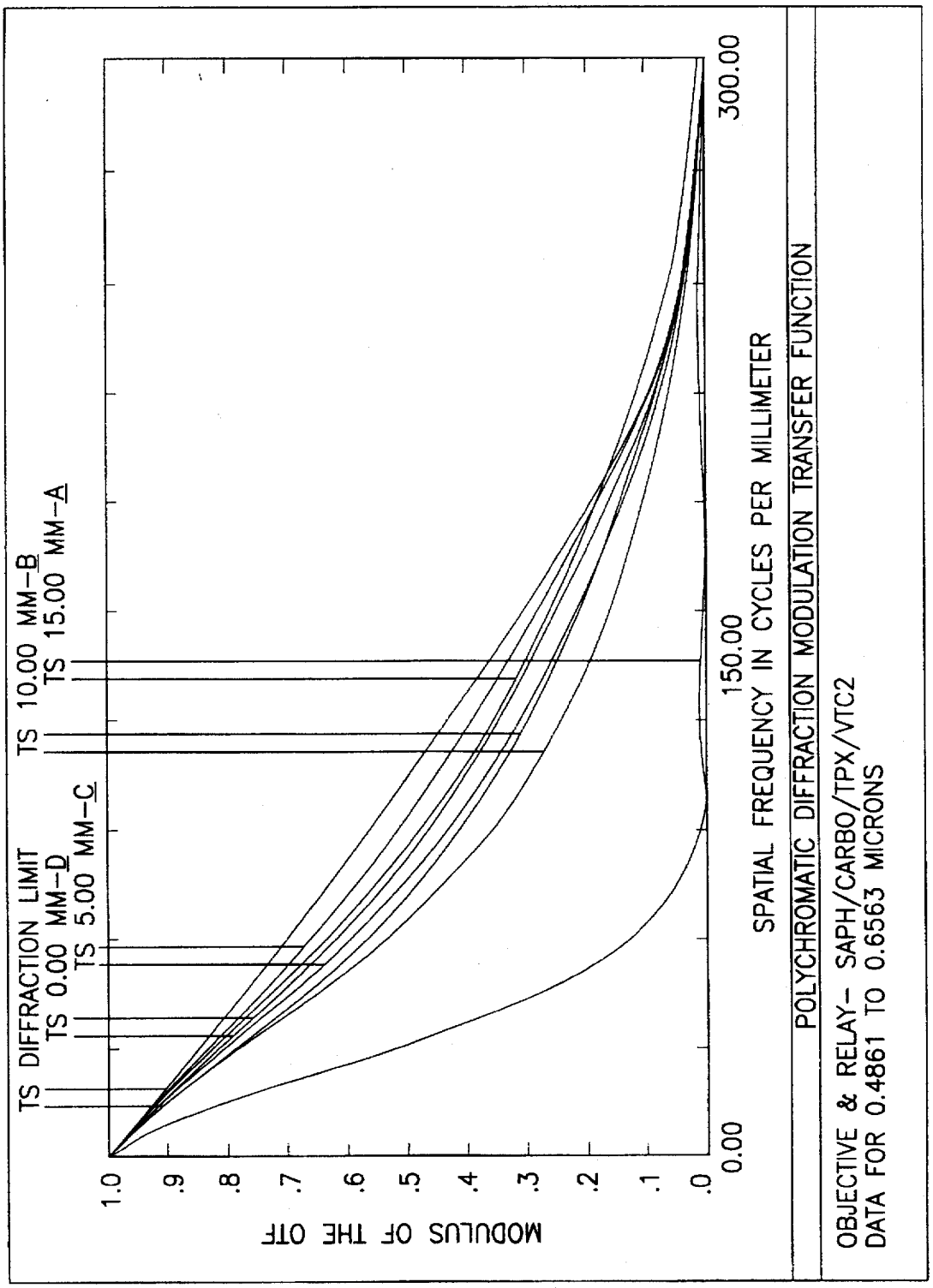
FIG. 6 shows a polychromatic diffraction modulation transfer function diagram for the second embodiment the invention.

FIG. 6 shows the Polychromatic Diffraction Modulation Transfer Function curves for the above four field points. For all four field points, the system has a very close to diffraction limited performance.

Figure 7:
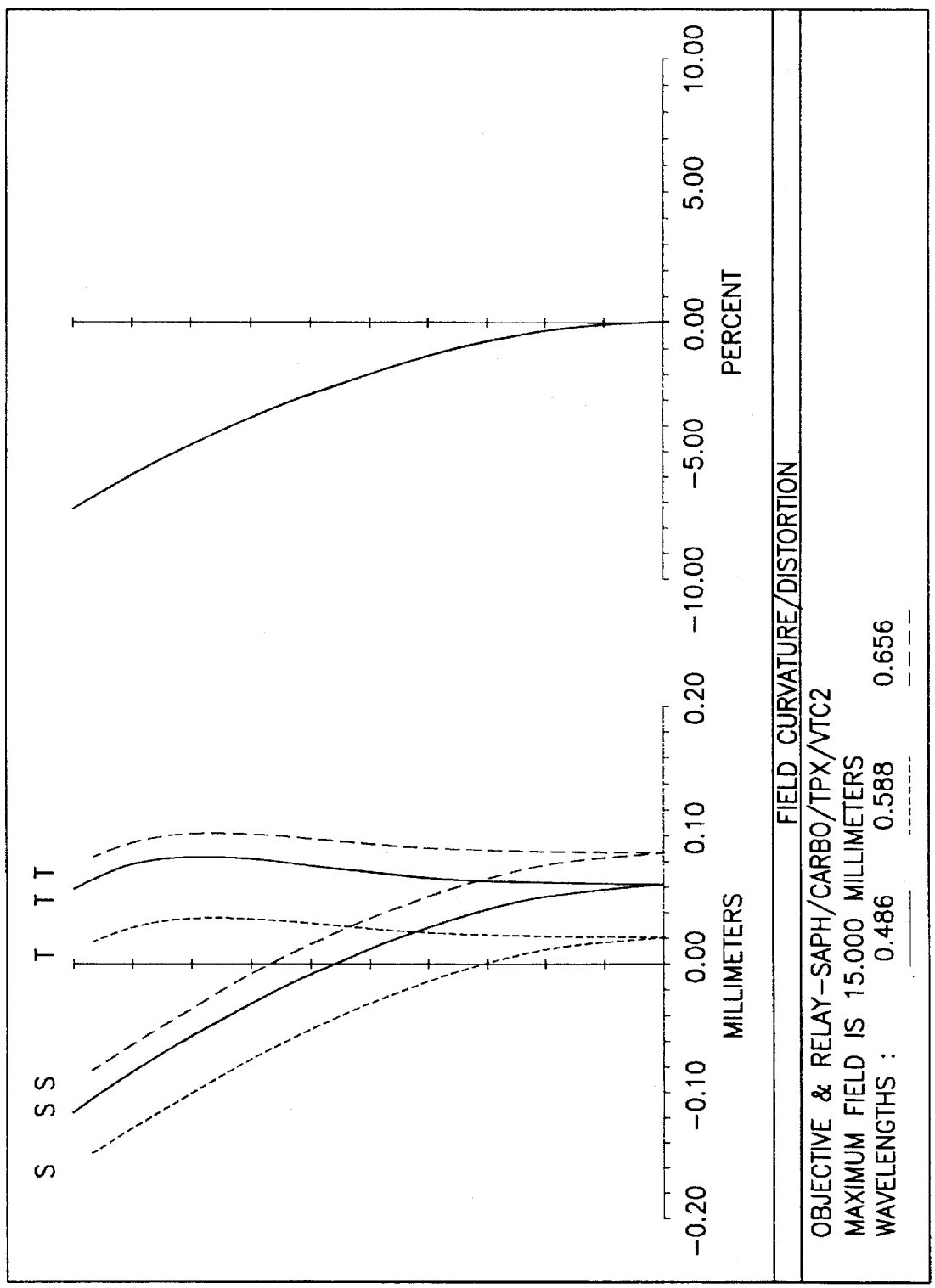
FIG. 7 shows field curvature and distortion diagrams for the invention.

FIG. 7 shows field curvature and distortion plots for the objective lens system. As the percent deviation from normal diagram indicates, the lens system of the invention displays excellent optical performance.

It should be appreciated that the all plastic monolithic relay lens system of the invention has several advantages over the prior art. For example, since all of the lens elements of the monolithic relay lens system 10 have similar elastic and thermal properties, the resulting relay lens system has a greater resistance to thermal and mechanical stress than conventional relay lens designs. Another important advantage of the monolithic relay lens system is the low reflection coefficients between the lens elements which obviates the need for anti-reflection (AR) coatings. This is in contrast to known relay lens systems which usually contain several glass/air, plastic/air or glass/plastic interfaces, each of which must be properly AR coated to lessen the severity of reflections due to the large index of refraction breaks.

In particular, the coefficient of reflection (r) of the surface between a first lens element connected to a second lens element in a relay lens system is defined by:

$$r = (n1-n2)^2/(n1+n2)^2 \quad (1)$$

where n1 is the coefficient of refraction for a first lens element and n2 is the coefficient of refraction for a second lens element. For a conventional relay lens system where the first "lens element" is air having a coefficient of refraction (air to air) $n1 \approx 1.000$, and the second lens element is glass having a coefficient of refraction (air to glass) $n2 \approx 1.5$, the reflection coefficient r would be approximately 0.04 (i.e., 4% of the light is reflected at each air/glass interface). The resultant reflected light at such interfaces reduces the available light for imaging and adds additional unwanted scattered light within the instrument, causing ghost images or other unwanted effects. Thus, unless the lens surface interfaces are AR coated, the image would be very dark and of poor quality. However, even where the surfaces are coated with some of the more modern and costly AR materials, the reflection coefficient may still be on the order of 0.005 to 0.01 at each interface.

By way of contrast, while the monolithic relay lens system of the invention has more interfaces than that found in conventional relay systems, the reflection coefficient of each interface is much smaller. For example, the index of refraction for acrylic is typically approximately 1.47 while that of the UV curing plastic cement is typically approximately 1.55. Thus, the resulting reflection coefficient r for an acrylic/cement interface would be approximately $7 \times 10^{-4}$, which is about ten times smaller than a very good AR coating. Similarly, the reflective coefficient r of the cement/polycarbonate interface is found to be about $1.5 \times 10^{-4}$, which is smaller yet. Thus, even with many more lenses, the overall transmission loss in the monolithic relay lens system of the invention is considerably smaller than that of the prior art even where the prior art uses AR coatings.

There have been described and illustrated herein preferred embodiments of a monolithic relay lens system for endoscopes and laparoscopes which utilizes alternating lens elements. While particular embodiments of the invention have been described, it is not intended that the invention be limited thereto, as it is intended that the invention be as broad in scope as the art will allow and that the specification be read likewise. Thus, while particular polymers for the polymeric lens elements of the rod lenses have been disclosed, it will be appreciated that other polymers with similar optical properties can be used. Furthermore while a particular type of plastic optical cement has been disclosed it will be understood that any other optical cement with similar properties can be used. Also, while particular dimensions and indices of refraction and reflection of the monolithic relay lens system have been disclosed, it will be recognized that other dimensions and indices may be also be used. Moreover, while particular configurations have been disclosed in reference to the number of lens element in a monolithic relay system, it will be appreciated that other configurations could be used as well. In addition, while a particular objective lens has been described, it will be appreciated that other suitable objective lenses can be used with the relay lens system of the invention. Furthermore, while particular methods of manufacture and assembly have been disclosed for the relay lens system, it will be understood that any other suitable method can be similarly used. It will therefore be appreciated by those skilled in the art that yet other modifications could be made to the provided invention without deviating from its spirit and scope as so claimed.

I claim:

1. A monolithic relay lens system for transmitting an image formed by an objective lens at the distal end of an endoscope to an eyepiece at the proximal end of the endoscope, said relay lens system comprising:

a) a plurality of biconvex optical cement lenses;

b) a plurality of first biconcave lenses made from a first polymeric material; and c) a plurality of second biconcave lenses made from a second polymeric material, wherein a first of said plurality of biconvex optical cement lenses is located between and bonds a first of said plurality of first biconcave lenses to a first of said plurality of second biconcave lenses, a second of said plurality of biconvex optical cement lenses is located between and bonds said first of said plurality of second biconcave lenses to a second of said plurality of first biconcave lenses, a third of said plurality of biconvex optical cement lenses is located between and bonds a second of said plurality of second biconcave lenses to said second of said first biconcave lenses.

2. A monolithic relay lens system according to claim 1, wherein:

said first polymeric material is acrylic.

3. A monolithic relay lens system according to claim 1, wherein:

said second polymeric material is polycarbonate.

4. A monolithic relay lens system according to claim 1, wherein:

said second polymeric material is polystyrene.

5. A monolithic relay lens system according to claim 1, wherein:

said first polymeric material is TPX.

6. A monolithic relay lens system according to claim 1, wherein:

said plurality of biconvex optical cement lenses are formed from ultraviolet curing plastic optical cement.

7. A monolithic relay lens system according to claim 6, wherein:

said first polymeric material is acrylic, and said second polymeric material is polycarbonate.

8. A monolithic relay lens system according to claim 6, wherein:

said first polymeric material is TPX, and said second polymeric material is polystyrene.

9. A monolithic relay lens system according to claim 6, wherein:

said first polymeric material, said second polymeric material, and said ultraviolet curing plastic optical cement have similar indices of refraction.

10. A monolithic relay lens system according to claim 6, wherein:

said first polymeric material, said second polymeric material, and said ultraviolet curing plastic optical cement have similar elastic and thermal properties.

11. A monolithic relay lens system according to claim 1, further comprising:

d) a plano-concave polymeric lens formed from said second polymeric material, wherein
said plano-concave polymeric lens is bonded to one of said plurality of first biconcave lenses by a fourth of said plurality of biconvex optical cement lenses.

12. A monolithic relay lens system according to claim 11, further comprising:

e) a concavo-planar polymeric lens formed from said first polymeric material, wherein
said concavo-planar polymeric lens is bonded to one of said plurality of second biconcave lenses by a fifth of said plurality of biconvex optical cement lenses.

13. A monolithic relay lens system according to claim 11, wherein:

said plano-concave polymeric lens is a first portion of a distal-most biconcave polymeric lens, with a second portion of said distal-most biconcave polymeric lens constituting a distal-most lens portion of said monolithic relay lens system, and said image is formed at a planar surface of said plano-concave polymeric lens inside said distal-most biconcave polymeric lens.

14. A monolithic relay lens system according to claim 1, wherein:

said monolithic relay lens system is comprised of a plurality of optical portions, each of said optical portions including said first, second, and third of said plurality of biconvex optical cement lenses, said first and second first biconcave lenses made of a first polymeric material, and said first and second biconcave lenses made of a second polymeric material, and each of said optical portions further including an equivalent of a plano-concave lens made from said first polymeric material, a fourth biconvex optical cement lens bonding said equivalent of a plano-concave lens to said first of said plurality of first biconcave lenses of said first polymeric material, an equivalent of a concavo-planar lens made from said first polymeric material, and a fifth biconvex optical cement lens bonding said equivalent of a plano-concave lens to one of said plurality of first biconcave lenses of said first polymeric material.

15. A monolithic relay lens system according to claim 14, wherein:

each said optical portion includes eight biconvex optical cement lenses, four of said first biconcave lenses made from a first polymeric material, three of said second biconcave lenses made from a second polymeric material, said equivalent of said plano-concave lens, and said equivalent of said concavo-planar lens.

16. A monolithic relay lens system according to claim 14, wherein:

at least two adjacent of said plurality of optical portions share a biconcave lens of said first polymeric material, with a first portion of said shared biconcave lens providing said equivalent of a concavo-planar lens, and a second portion of said shared biconcave lens providing said equivalent of a plano-concave lens.

17. A monolithic relay lens system according to claim 14, wherein:

said plurality of optical portions comprises three optical portions.

18. An endoscope for forming and transmitting an image of an observed area to an observer, said endoscope comprising:

a) a monolithic relay lens system which transmits the image from a distal end of said monolithic relay lens system to a proximal end of said monolithic relay lens system, and having
1) a plurality of biconvex optical cement lenses;
2) a plurality of first biconcave lenses made from a first polymeric material; and
3) a plurality of second biconcave lenses made from a second polymeric material, wherein
a first of said plurality of biconvex optical cement lenses is located between and bonds a first of said plurality of first biconcave lenses to a first of said plurality of second biconcave lenses,
a second of said plurality of biconvex optical cement lenses is located between and bonds said first of said plurality of second biconcave lenses to a second of said plurality of first biconcave lenses,
a third of said plurality of biconvex optical cement lenses is located between and bonds a second of said plurality of second biconcave lenses to said second of said first biconcave lenses; and b) an objective lens system coupled to said distal end of said monolithic relay lens system and for forming the image at said distal end of said monolithic relay lens system, said objective lens system including
1) a distal lens section having
a sapphire spheric plano-convex lens element with a planar surface and a convex surface,
a first polymeric material aspheric lens element with a concave surface and a convex surface, and
an air meniscus lens element formed by said convex surface of said spheric sapphire lens element and said concave surface of said first polymeric material lens element, said planar surface of said sapphire lens element forming a distal end of said objective lens element, 2) a proximal lens section having an aspheric rod lens element coupled directly at its proximal end to said monolithic relay lens system, and 3) an air gap formed by said first polymeric material lens element and said second polymeric material lens element.

19. An endoscope according to claim 18, wherein:

said aspheric rod lens element is a first portion of a distal-most biconcave polymeric lens, with a second portion of said distal-most biconcave polymeric lens constituting a distal-most lens portion of said monolithic relay lens system, and said image at said distal end of said monolithic relay lens system being formed inside said distal-most biconcave polymeric lens.

20. An endoscope for forming and transmitting an image of an observed area to an observer, said endoscope comprising:

a) a monolithic relay lens system with a distal end and a proximal end, said monolithic relay lens system having a plurality of biconvex optical cement lenses, a plurality of first biconcave lenses made from a first polymeric material, and a plurality of second biconcave lenses made from a second polymeric material, which together transmit the image from said distal end to said proximal end; and b) an objective lens system coupled to said distal end of said monolithic relay lens system and forming the image at said distal end of said monolithic relay lens system, said objective lens system including, (1) a distal lens section having a sapphire spheric plano-convex lens element with a planar surface and a convex surface, a first polymeric material aspheric lens element with a concave surface and a convex surface, and an air meniscus lens element formed by said convex surface of said spheric sapphire lens element and said concave surface of said first polymeric material lens element, said planar surface of said sapphire lens element forming a distal end of said objective lens element, (2) a proximal lens section having an aspheric rod lens element coupled directly at its proximal end to said monolithic relay lens system, and (3) an air gap formed by said first polymeric material lens element and said second polymeric material lens element.

21. An endoscope according to claim 20, wherein:

said aspheric rod lens element is a first portion of a distal-most biconcave polymeric lens, with a second portion of said distal-most biconcave polymeric lens constituting a distal-most lens portion of said monolithic relay lens system, and said image at said distal end of said monolithic relay lens system being formed inside said distal-most biconcave polymeric lens.

* * * * *